No. 895,726. PATENTED AUG. 11, 1908.
P. L. CLIFTON.
ART OF MANUFACTURING SALT.
APPLICATION FILED DEC. 24, 1906.
3 SHEETS—SHEET 1.
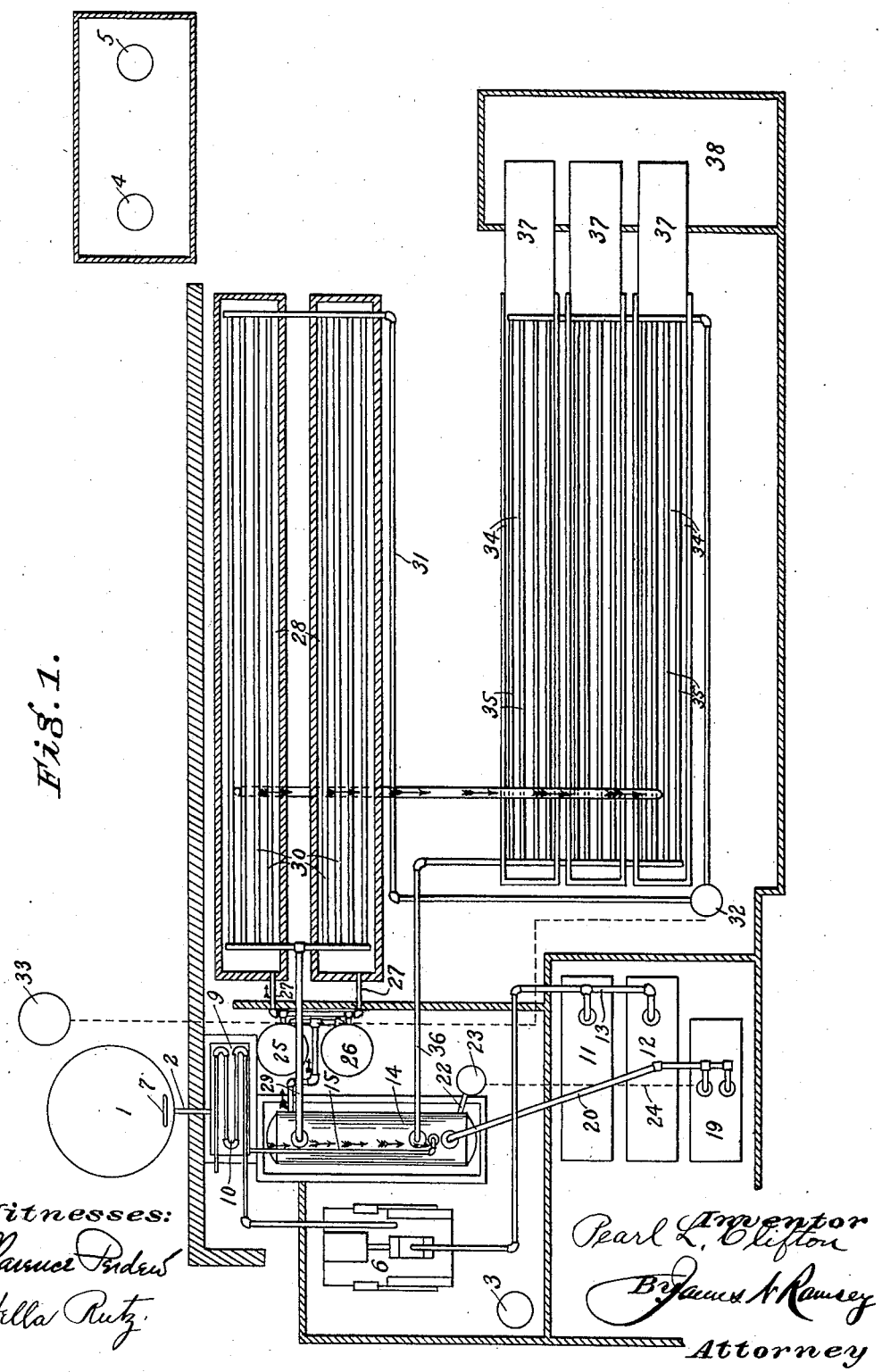

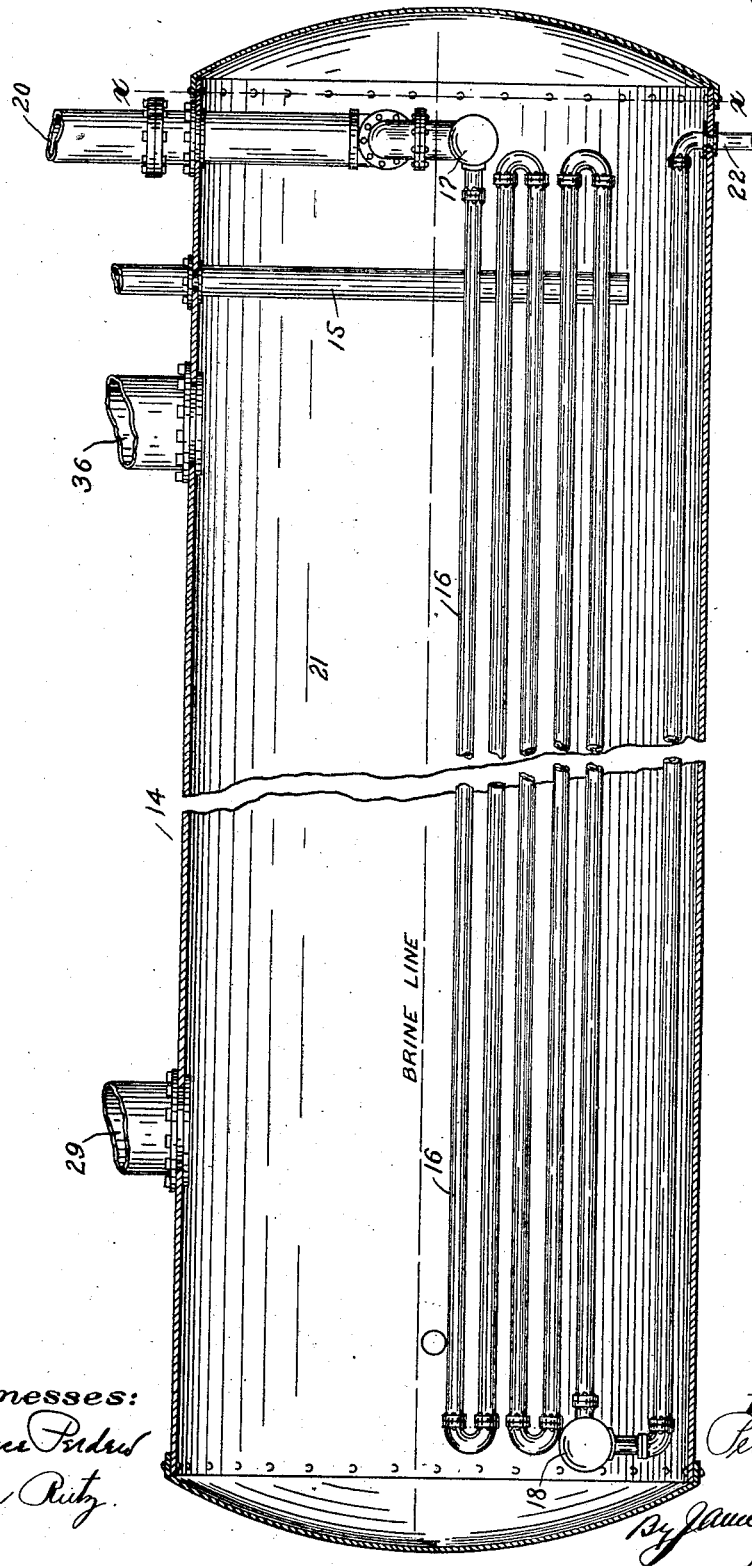

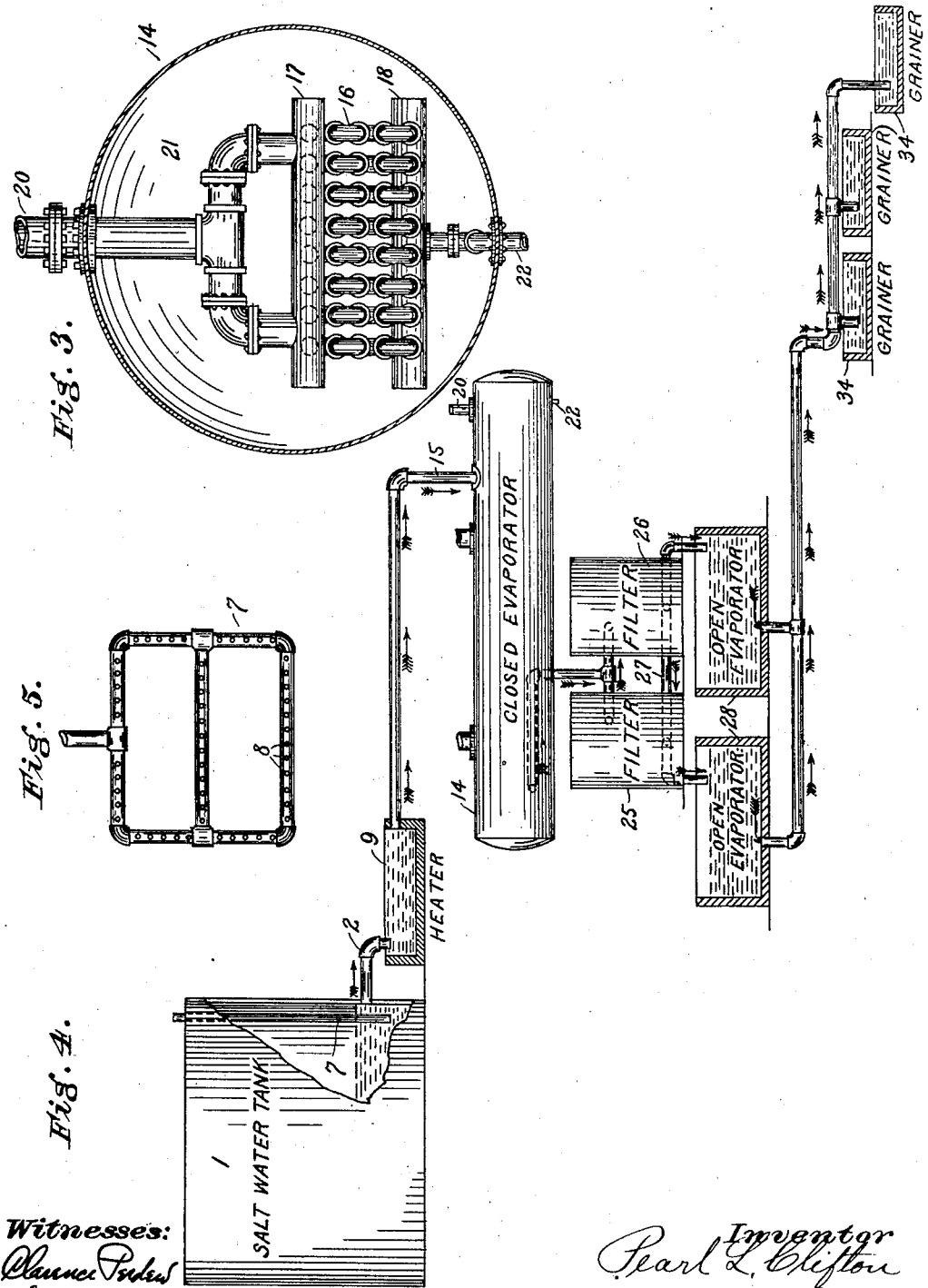

UNITED STATES PATENT OFFICE.

PEARL L. CLIFTON, OF POMEROY, OHIO, ASSIGNOR TO THE POMEROY SALT ASSOCIATION COMPANY, OF POMEROY, OHIO, A CORPORATION OF OHIO.

ART OF MANUFACTURING SALT.

No. 895,726.  Specification of Letters Patent.  Patented Aug. 11, 1908.

Original application filed April 25, 1906, Serial No. 313,533. Divided and this application filed December 24, 1906. Serial No. 349,314.

*To all whom it may concern:*

Be it known that I, PEARL L. CLIFTON, a citizen of the United States, residing at Pomeroy, in the county of Meigs and State of Ohio, have invented certain new and useful Improvements in the Art of Manufacturing Salt, of which the following is a specification.

My invention relates to the manufacture of salt from natural salt brine.

The object of my invention is to simplify and cheapen the manufacture of salt and to improve its quality.

My invention consists in the process herein set forth and claimed.

This application is a division of application Serial No. 313,533, filed April 25, 1906.

In the drawings which serve to illustrate one manner of utilizing said process: Figure 1 is a diagrammatic plan view showing the location and arrangement of the parts of a salt making plant in which my process is adapted to be used. Fig. 2 is an enlarged longitudinal section of the closed evaporator showing the various pipes in full lines, the center being broken away for lack of space. Fig. 3 is a vertical section on the line $x$—$x$ of Fig. 2 showing the pipes in elevation. Fig. 4 is a diagrammatic view of a salt making plant in which my process is adapted to be used. Fig. 5 is a side elevation of the aerator.

The process of manufacturing salt from natural salt brine in accordance with my invention may be accomplished by the use of such apparatus as desired, but in order that my invention may be fully and clearly understood, I prefer employing apparatus constructed and adapted to operate substantially as follows: A salt brine tank 1 of any suitable construction but preferably cylindrical in form and having an open top and a discharge outlet 2 near its bottom is adapted to be supplied with natural salt brine pumped from wells such as 3, 4 and 5 by means of an air compressor 6 having suitable connection with said wells and said wells being provided with pipes (not shown) to convey the brine into said tank. Said salt brine tank 1 is provided with an aerator 7 placed adjacent the discharge outlet 2 communicating with said air compressor and is provided with perforations 8 to distribute and thoroughly aerate the brine to oxidize iron therein before it is discharged from the salt brine tank.

A heater 9 comprising an open top receptacle for the brine through the discharge outlet 2 is arranged near the salt brine tank 1. This heater 9 is provided with steam coils 10 distributed therein and adapted to be supplied with exhaust steam from the air compressor 6 for the purpose of heating brine in which said coils are immersed from about 60 degrees F. to about 180 degrees F. to oxidize the iron in the brine and to prepare the brine for further treatment. The air compressor 6 is supplied with steam from the boilers 11 and 12 through steam pipe 13. The brine is conveyed from the heater 9 into a closed evaporator 14 by means of a brine tube 15 which extends from near the top of the heater to near the bottom of the closed evaporator. The closed evaporator is provided in its lower part with a series of steam coils 16 secured in and communicating with a manifold 17 at one end and 18 at the other end and supplied with live steam from boiler 19 through steam pipe 20 which steam is adapted to circulate through said series of coils which are immersed in the brine to heat the same to a high degree of temperature for the purpose of generating steam from the brine which is collected in the steam space 21, to oxidize the remaining iron in the brine, to increase the specific gravity of the unevaporated brine and to be exhausted through discharge pipe 22 into a steam trap 23 from which the condensation is returned to the boiler in the form of hot water through hot water tube 24 for continuous use.

The salt brine in the closed evaporator is conveyed to a filter 25 or 26 where the oxidized iron and other ingredients deleterious to the salt are mechanically separated from the salt brine which is conveyed therefrom through pipes 27 to open evaporators 28, where it is heated by the exhaust steam generated from the salt brine in the closed evaporator 14, the same being conveyed by steam pipe 29 to steam coils 30 immersed in the brine and provided with a discharge outlet 31 through which the condensed steam is exhausted into a suitable tank 32 from which it may be pumped into the feeding tank 33 as indicated by dotted line. This feeding tank 33 is a fresh water storage tank for boiler feed purposes.

The brine in the open evaporator is aerated and heated successively until the proper specific gravity of the brine is obtained. It is then conveyed into grainers 34 comprising open receptacles which are supplied with steam coils 35 suspended therein above the bottom of each grainer and which are supplied with steam generated from the brine in the closed evaporator 14 and conveyed by steam pipe 36 into said grainers where it passes through the steam coils 35 and heats the brine sufficiently to precipitate the salt therein, the steam in the coils condensing and passing into the tank 32. Each grainer is preferably provided with an endless carrier adapted to engage the inner bottom surface from end to end and draw the salt as it precipitates up inclines 37 to a draining room 38 where the salt is deposited and drained in the usual way.

I have shown filters 25 and 26 respectively and prefer to use them alternately in order that one may be cleaned while the other is in use and vice versa thus avoiding any interruption in the operation. If desired, however, one filter only may be used. The salt is conveyed from the draining room to a store-room where it is allowed to remain until sufficiently dry to be in condition for shipment in barrels or otherwise as desired.

The method of treatment of the brine according to my invention improves the quality of the salt by thorough removal of such ingredients as are deleterious to the salt and at the same time simplifies and cheapens the manufacture by economy in the use of fuel, saving effected by the utilization of a cheaper grade of fuel and saving in the amount of apparatus required and in the time necessary to obtain the salt from the brine.

From the above description it will be understood that the natural salt brine is preferably pumped from wells into a salt brine tank by means of an air-compressor which also forces air through said brine in the tank to aerate it for the purpose of oxidizing iron contained in said brine. The natural salt brine, which is at a temperature of about 60 degrees F., is conveyed into a heater comprising an open top receptacle supplied with coils of pipe which are immersed in the brine and heated by exhaust steam from the compressor to a temperature of about 180 degrees F. to oxidize additional iron contained in the brine and to prepare said brine for its reception into a closed evaporator provided in its lower part with coils of pipe supplied with live steam from boilers. The salt brine is conveyed from the heater into the lower part of the closed evaporator in which it is heated to a high degree of temperature by means of the steam coils immersed therein to oxidize the remaining iron contained in the brine, to increase the specific gravity of the brine and to produce and collect steam from said brine in a steam space above the brine by which to heat said brine after it is conveyed from said closed evaporator to open evaporators. The unevaporated brine in the closed evaporator is conveyed into and through a filter where the oxidized iron and other ingredients are separated from the salt brine which is then conveyed into open evaporators supplied with steam coils which are immersed in said brine and supplied with heat by means of the steam generated from the brine in the closed evaporator as before stated. The brine in the open evaporators thus aerated and heated successively has its specific gravity increased sufficiently to thoroughly and rapidly precipitate the salt which is contained therein.

The steam generated in the closed evaporator is housed in a space sufficiently large and carried away through pipes of ample size to prevent any appreciable pressure in the closed evaporator upon the unevaporated brine which would retard the evaporation. The great freedom by which the steam from the brine is released from the steam space in the closed evaporator increases the effectiveness and volume of evaporation produced from the salt brine and therefore the necessary specific gravity will be more rapidly obtained and more heat units will be generated in the form of steam than otherwise to be distributed to the coils in the open evaporators and grainers and radiated to the brine contained therein.

My process does not contemplate the creating of a vacuum to assist the evaporation as such vacuum would cause the steam therein to be generated to be no more than warm vapor which would be of no service when carried to the steam coils of the open evaporating tanks or grainers, but my process is economical for the reason that the great heating surface in the proper kind of boilers properly equipped will produce more heat units with inferior fuel than with the same amount and better quality of fuel consumed under pans, furnaces or kettles and radiate the heat units to the brine through the steam coil in the closed evaporator more uniformly and effectively than by direct heat. The steam passing through the coil is condensed and the condensation returned to the boilers with very slight loss of heat in transmission, thus maintaining a high degree temperature of feed water without use of any fuel or steam to obtain same. My process is continuous and therefore substantially no loss results. It is an improvement over the method of manufacturing salt in grainers which are supplied with fresh brine.

I claim:

In the art of manufacturing salt the process consisting in first aerating the salt brine to partially oxidize the iron contained in said brine, next subjecting said salt brine to heat to still further oxidize the iron contained in said brine, and then filtering said brine to remove the oxidized iron therefrom.

PEARL L. CLIFTON.

Witnesses:
H. H. KUNTZ,
A. R. CLIFTON.